United States Patent
Chen et al.

(10) Patent No.: US 9,878,919 B2
(45) Date of Patent: Jan. 30, 2018

(54) POTASSIUM FLUOTITANATE MANUFACTURE AND DEVICE BACKGROUND

(75) Inventors: Xuemin Chen, Guangdong (CN); Qingdong Ye, Guangdong (CN); Jianguo Li, Guangdong (CN); Chaowen Liu, Guangdong (CN); Yueming Yu, Guangdong (CN)

(73) Assignee: SHENZHEN SUNXING LIGHT ALLOYS MATERIALS CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 12/921,805

(22) PCT Filed: Jul. 29, 2010

(86) PCT No.: PCT/CN2010/075565
§ 371 (c)(1),
(2), (4) Date: Sep. 10, 2010

(87) PCT Pub. No.: WO2011/120274
PCT Pub. Date: Oct. 6, 2011

(65) Prior Publication Data
US 2012/0039791 A1   Feb. 16, 2012

(30) Foreign Application Priority Data
Apr. 2, 2010 (CN) .......................... 2010 1 0144172

(51) Int. Cl.
*C01D 3/02* (2006.01)
*C01G 23/00* (2006.01)
(Continued)

(52) U.S. Cl.
CPC ......... *C01G 23/005* (2013.01); *B01D 5/0006* (2013.01); *B01D 5/009* (2013.01);
(Continued)

(58) Field of Classification Search
CPC ............................ C01G 23/002; C01G 23/005
(Continued)

(56) References Cited

U.S. PATENT DOCUMENTS 3,829,310 A * 8/1974 Mahy .............................. 75/368
3,829,550 A * 8/1974 Ronzio et al. .................. 423/54
(Continued)

FOREIGN PATENT DOCUMENTS

GB            206809       * 5/1923

OTHER PUBLICATIONS

Wu, Zun-hong, "Recovery of K2TiF6 from Ta/Nb Ore Extraction Raffinate", Rare metals and cemented carbides, vol. 34, No. 1, Mar. 2006, pp. 46-48.*
(Continued)

*Primary Examiner* — Ngoc-Yen Nguyen
(74) *Attorney, Agent, or Firm* — Jackson IPG PLLC; Demian K. Jackson

(57) ABSTRACT

The invention provides a Potassium Fluotitanate ($K_2TIF6$) manufacture process. The Potassium Fluotitanate ($K_2TIF6$) manufacture process includes steps: A. providing titanium ferrum powder to a reaction furnace and adding HF and peroxide solution to react with the titanium ferrum powder sufficiently to manufacture $H_2TiF_6$, B. filtrating the sufficiently mixed solution of step A and adding it to another reaction furnace, and then after the $H_2TiF_6$ cools off, adding Potassium Chloride (KCl) solution to react with the mixed solution to manufacture Potassium Fluotitanate ($K_2TiF_6$); C. adding $K_2CO_3$ solution to the remaining solution of step B and react with the remaining solution and controlling the pH value, the element Fe is recycled by a form of $Fe(OH)_3$ flocculent precipitate and the Potassium Chloride (KCl) and KF solution are recycled. This invention has these advantages: adding peroxide to the titanium ferrum powder can
(Continued)

oxidize $Fe^{2+}$ into $Fe^{3+}$ and adding $K_2CO_3$ solution to clean element Fe out by a form of $Fe(OH)_3$ flocculent precipitate, and the hydrofluoric acid (HF) can be recycled which can realize the HF zero polluting discharge.

4 Claims, 1 Drawing Sheet

(51) Int. Cl.
  *B01D 5/00* (2006.01)
  *B01J 19/02* (2006.01)
  *B01J 19/18* (2006.01)
  *C01G 45/06* (2006.01)

(52) U.S. Cl.
  CPC ............... *B01J 19/02* (2013.01); *B01J 19/18* (2013.01); *C01G 23/002* (2013.01); *C01G 45/06* (2013.01); *B01J 2219/00101* (2013.01); *B01J 2219/0227* (2013.01); *B01J 2219/0245* (2013.01)

(58) Field of Classification Search
  USPC ................ 423/71, 72, 82, 83, 144, 464, 632
  See application file for complete search history.

(56) References Cited

U.S. PATENT DOCUMENTS 3,957,804 A * 5/1976 Ishioka et al. ................ 546/317
4,168,297 A * 9/1979 Nagasubramanian et al. . 423/70
5,665,783 A * 9/1997 Katzakian et al. ............. 521/26

OTHER PUBLICATIONS

Abstract of GB 206809, May 1924.*

* cited by examiner

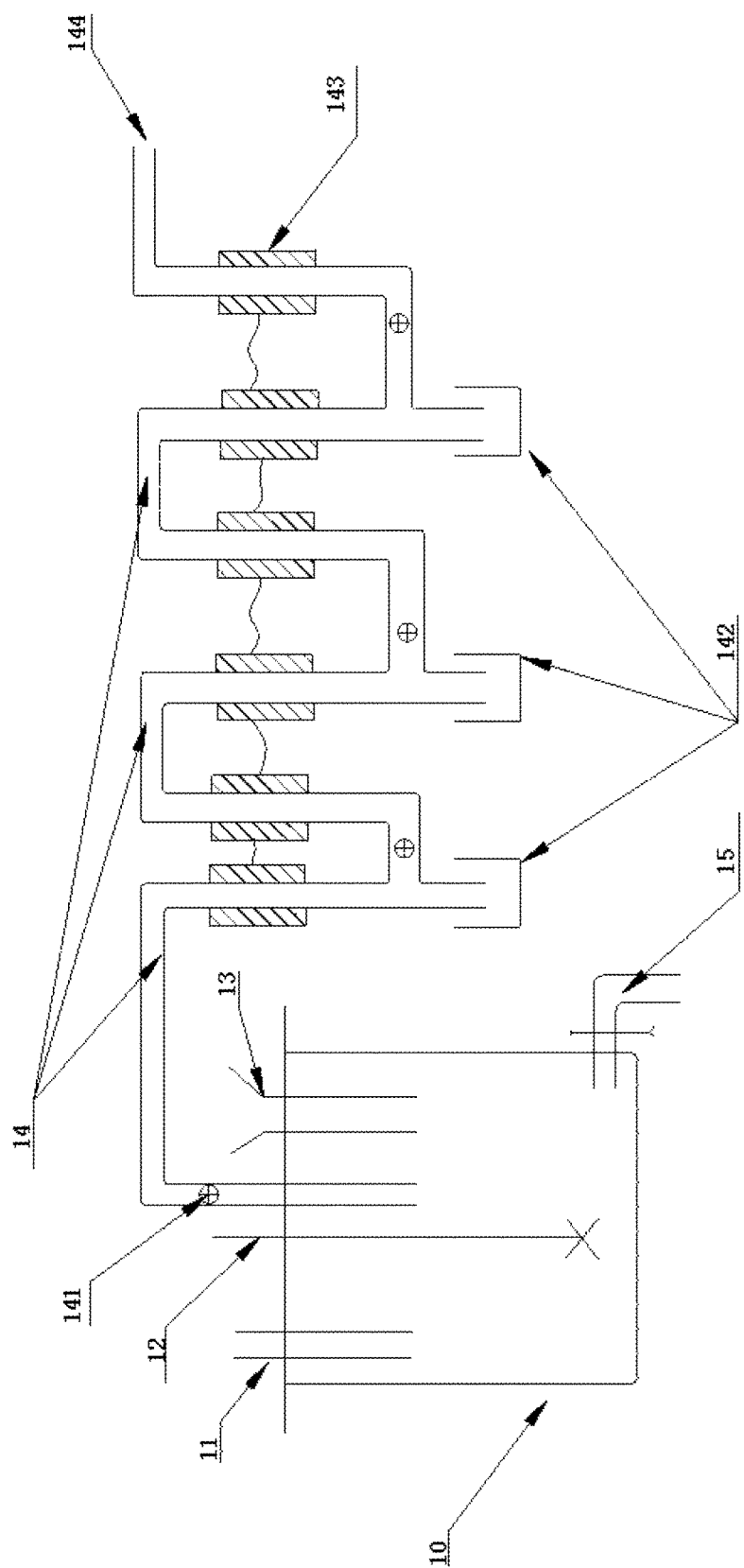

POTASSIUM FLUOTITANATE MANUFACTURE AND DEVICE BACKGROUND

BACKGROUND OF THE INVENTION

1. Field of the Invention

This invention belongs to the fine chemical industry, especially to a potassium fluotitanate ($K_2TiF_6$) manufacture process and device.

2. Description of the Related Art

The potassium fluotitanate ($K_2TiF_6$) is used to be one of the basic material of manufacturing Al—Ti—B alloy, so its quantity and purity may affect the manufacture of the Al—Ti—B alloy. According to the manufacture of potassium fluotitanate ($K_2TiF_6$), for some traditional process, such as using $H_2TiF_6$, or $H_2TiO_3$, a lot of heat may be generated when the titanium ferrum powder is mixed so that the temperature of the reaction furnace may rise to 100~200° C. This will lead to generate a lot of hydrofluoric acid (HF) steam. Meanwhile, a lot of waste including element fluorine may be generated to be a solution to environment. According to the traditional potassium fluotitanate ($K_2TiF_6$) manufacture process, the solution by the hydrofluoric acid (HF) and element Fe is a serious problem.

SUMMARY OF THE INVENTION

The present invention is directed to provide a potassium fluotitanate ($K_2TiF_6$) manufacture process which can reduce the generation of waste residue and liquid including element fluorine by adding $K_2CO_3$ solution.

According to this invention, a potassium fluotitanate ($K_2TiF_6$) manufacture process comprises following steps:

A. providing titanium ferrum powder to a reaction furnace and adding HF and peroxide solution to react with the titanium ferrum powder sufficiently to manufacture $H_2TiF_6$;

B. filtrating the sufficiently mixed solution of step A and adding it to another reaction furnace, and then after the $H_2TiF_6$ cools off, adding potassium chloride (KCl) solution to react with the mixed solution to manufacture potassium fluotitanate ($K_2TiF_6$), the potassium fluotitanate ($K_2TiF_6$) is recycled by centrifuge dripping filtrating; and C. adding $K_2CO_3$ solution to the remaining solution of step B and react with the remaining solution and controlling the pH value, the element Fe is recycled by a form of $Fe(OH)_3$ flocculent precipitate and the potassium chloride (KCl) and KF solution are recycled.

What is preferred is the peroxide is inorganic peroxide or organic peroxide.

What is preferred is the inorganic peroxide is $H_2O_2$ or $K_2O_2$, and the organic peroxide is $CH_3CO_2OH$.

What is preferred is during the step C, the pH value is in a range of 2~3, 3~4, 4~5, or 5~7.

The present invention is directed to provide a potassium fluotitanate ($K_2TiF_6$) manufacture device to ensure the reaction and recycle the HF stream.

What is preferred is a potassium fluotitanate ($K_2TiF_6$) manufacturing reaction furnace comprising a reaction furnace main body, a sealing cover sealed the reaction furnace main body, an output, and a stirring unit 12 disposed in the reaction furnace main body, wherein the sealing cover comprises several hole accesses to add hydrofluoric acid (HF), titanium ferrum powder accesses, and HF steam recycling condensation device.

What is preferred is wherein the HF steam recycling condensation device including several bent condenser tubes, an HF recycling groove is disposed at the end of the bent part, the condenser tube further comprises a condensation water device connecting to the adjacent condenser tube.

What is preferred is the potassium fluotitanate ($K_2TiF_6$) manufacturing reaction furnace, wherein the hydrofluoric acid (HF) steam recycling condensation device comprises bent condenser tube and an air blower is disposed at the bent part of the condenser tube separately.

What is preferred is the potassium fluotitanate ($K_2TiF_6$) manufacturing reaction furnace, wherein a graphite layer is disposed at the inside of the reaction furnace main body and the material of the stirring unit is polyvinyl chloride (PVC) or polypropylene (PP).

This invention has these advantages: adding peroxide to the titanium ferrum powder can oxidize $Fe^{2+}$ into $Fe^{3+}$ and adding $K_2CO_3$ solution to clean element Fe out by a form of $Fe(OH)_3$ flocculent precipitate, and the hydrofluoric acid (HF) can be recycled which can realize the HF zero polluting discharge. And meanwhile, the potassium fluotitanate ($K_2TiF_6$) manufacturing reaction furnace can recycle the HF stream and oxidize $Fe^{2+}$ into $Fe^{3+}$ and adding $K_2CO_3$ solution to clean element Fe out by a form of $Fe(OH)_3$ flocculent precipitate.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 1 is a cross-sectional schematic view of a potassium fluotitanate manufacturing reaction furnace according to an embodiment of present invention.

DETAILED DESCRIPTION OF PREFERRED EMBODIMENTS

Example 1

As shown in FIG. 1, a potassium fluotitanate ($K_2TiF_6$) manufacturing reaction furnace is provided. The potassium fluotitanate ($K_2TiF_6$) manufacturing reaction furnace includes a reaction furnace main body 10, a sealing cover sealed the reaction furnace main body, an output 15, and a stirring unit 12 disposed in the reaction furnace main body. The sealing cover includes several hole accesses 11 to add hydrofluoric acid (HF), titanium ferrum powder accesses 13, and HF steam recycling condensation device including several bent condenser tubes 14. An air blower 143 is disposed at the bent part of the condenser tube separately, and an HF recycling groove 142 is disposed at the end of the bent part. The condenser tube further includes a condensation water device 143 connecting to the adjacent condenser tube. An HF recycle device 144 is disposed at the end of the condenser tube to recycle HF which can realize the HF zero polluting discharge. A graphite layer is disposed at the inside of the reaction furnace main body. The material of the stirring unit is polyvinyl chloride (PVC) or polypropylene (PP) to sufficiently mix the titanium ferrum powder with a low cost.

A Potassium Fluotitanate ($K_2TiF_6$) manufacturing process includes following steps:

A. providing titanium ferrum powder to a reaction furnace and adding HF and hydrogen peroxide to react with the titanium ferrum powder sufficiently to manufacture $H_2TiF_6$;

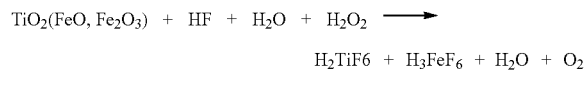

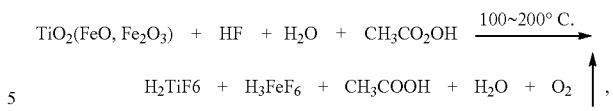

According to this embodiment, the quantity of the titanium ferrum powder is one ton. The concentration of the HF is in a range of 5~20% and the quantity is about 2.5 tons. The concentration of the hydrogen peroxide is in a range of 5~30%, what is preferred is 10~20% and quantity is about 3 tons. Adding 10~20% hydrogen peroxide to the HF can oxidize $Fe^{2+}$ into $Fe^{3+}$ of the titanium ferrum powder in order to avoid generating $FeTiF_6$. Thus, the element Fe can be cleaned out by a form of $Fe(OH)_3$ flocculent precipitate in the following steps.

B. filtrating the sufficiently mixed solution of step A and adding it to another reaction furnace, and then after the $H_2TiF_6$ cools off, adding potassium chloride (KCl) solution with a concentration 30~35% to react with the mixed solution to manufacture potassium fluotitanate ($K_2TiF_6$):

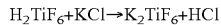

According to this embodiment, the quantity of the potassium chloride (KCl) is three tons.

The potassium fluotitanate ($K_2TiF_6$) is recycled by centrifuge dripping filtrating and the remaining solution is transmitted to a third reaction furnace.

C. adding $K_2CO_3$ solution with a concentration 30~35% to the remaining solution of step B and react with the remaining solution.

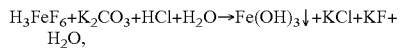

The quantity of the $K_2CO_3$ solution is two tons and its pH value is in a range of 3~4. The element Fe is recycled by a form of $Fe(OH)_3$ flocculent precipitate and the potassium chloride (KCl) and KF solution are recycled to be reused.

Example 2

A potassium fluotitanate ($K_2TiF_6$) manufacturing reaction furnace is provided. The potassium fluotitanate ($K_2TiF_6$) manufacturing reaction furnace includes a reaction furnace main body 10, a sealing cover sealed the reaction furnace main body, an output 15, and a stirring unit 12 disposed in the reaction furnace main body. The sealing cover includes several hole accesses 11 to add hydrofluoric acid (HF), titanium ferrum powder accesses 13, and HF steam recycling condensation device including several bent condenser tubes 14. An air blower 143 is disposed at the bent part of the condenser tube separately, and an HF recycling groove 142 is disposed at the end of the bent part. The condenser tube further includes a condensation water device 143 connecting to the adjacent condenser tube. An HF recycle device 144 is disposed at the end of the condenser tube to recycle HF which can realize the HF zero polluting discharge. A graphite layer is disposed at the inside of the reaction furnace main body. The material of the stirring unit is polyvinyl chloride (PVC) or polypropylene (PP) to sufficiently mix the titanium ferrum powder with a low cost.

A potassium fluotitanate ($K_2TiF_6$) manufacturing process includes following steps:

A. providing titanium ferrum powder to a reaction furnace and adding HF and hydrogen peroxide to react with the titanium ferrum powder sufficiently to manufacture $H_2TiF_6$:

According to this embodiment, the quantity of the titanium ferrum powder is one ton. The concentration of the HF is in a range of 5~20% and the quantity is about 2.5 tons. The concentration of the peracetic acid is in a range of 5~30%, what is preferred is 10~20% and quantity is about 3 tons. Adding 10~20% hydrogen peroxide to the HF can oxidize $Fe^{2+}$ into $Fe^{3+}$ of the titanium ferrum powder in order to avoid generating $FeTiF_6$. Thus, the element Fe can be cleaned out by a form of $Fe(OH)_3$ flocculent precipitate in the following steps.

B. filtrating the sufficiently mixed solution of step A and adding it to another reaction furnace, and then after the $H_2TiF_6$ cools off, adding potassium chloride (KCl) solution with a concentration 15~20% to react with the mixed solution to manufacture potassium fluotitanate ($K_2TiF_6$):

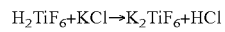

According to this embodiment, the quantity of the potassium chloride (KCl) is three tons.

The potassium fluotitanate ($K_2TiF_6$) is recycled by centrifuge dripping filtrating and the remaining solution is transmitted to a third reaction furnace.

C. adding $K_2CO_3$ solution with a concentration 15~20% to the remaining solution of step B and react with the remaining solution.

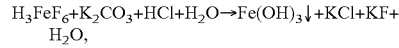

The quantity of the $K_2CO_3$ solution is two tons and its pH value is in a range of 4~5. The element Fe is recycled by a form of $Fe(OH)_3$ flocculent precipitate and the potassium chloride (KCl) and KF solution are recycled to be reused.

What is claimed is:
1. A potassium fluotitanate ($K_2TiF_6$) manufacture process comprises the following steps:
   A. providing titanium ferrum powder to a first reaction furnace and adding HF and hydrogen peroxide solution to concurrently react with the titanium ferrum powder sufficiently to manufacture $H_2TiF_6$ and so as to oxidize $Fe^{2+}$ into $Fe^{3+}$ to inhibit production of $FeTiF_6$ according to a reaction

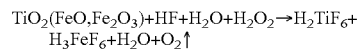

to form a mixed product solution,
   B. filtrating the mixed product solution of step A and adding the resulting filtrated product solution to a second reaction furnace and allowing the filtrated product solution to cool and then, after the $H_2TiF_6$ cools off, adding potassium chloride (KCl) solution to react with the filtrated product solution to manufacture potassium fluotitanate ($K_2TiF_6$) according to a reaction
   $H_2TiF_6+2KCl \rightarrow K_2TiF_6+2HCl$, wherein the potassium fluotitanate ($K_2TiF_6$) is removed by centrifuge dripping filtrating; and
   C. adding $K_2CO_3$ solution to a $H_3FeF_6+H_2O+HCl$ solution remained after the centrifuge dripping filtrating of step B to a third reaction furnace and react with the remaining solution and controlling the pH value according to a reaction $H_3FeF_6+K_2CO_3+HCl+H_2O \rightarrow Fe(OH)_3+KCl+KF+H_2O$, wherein the element Fe is removed by a form of $Fe(OH)_3$ flocculent precipitate and the potassium chloride (KCl) is recycled.

2. The potassium fluotitanate ($K_2TiF_6$) manufacture process according to claim 1, wherein during the step C, the pH value is controlled in a range of 2~3, 3~4, 4~5, or 5~7.

3. A potassium fluotitanate ($K_2TiF_6$) manufacture process comprises the following steps:
   A. providing titanium ferrum powder to a first reaction furnace and adding HF and peracetic acid solution to concurrently react with the titanium ferrum powder sufficiently to manufacture $H_2TiF_6$ and so as to oxidize $Fe^{2+}$ into $Fe^{3+}$ so as to inhibit production of $FeTiF_6$ according to a reaction $TiO_2(FeO,Fe_2O_3)+HF+H_2O+CH_3CO_2OH \rightarrow H_2TiF_6+H_3FeF_6+CH_3COOH+H_2O+O_2\uparrow$ to form a mixed product solution,
   B. filtrating the mixed product solution of step A and adding the resulting filtrated product solution to a second reaction furnace and allowing the filtrated product solution to cool and then, after the $H_2TiF_6$ cools off, adding potassium chloride (KCl) solution to react with the filtrated product solution to manufacture potassium fluotitanate ($K_2TiF_6$) according to a reaction $H_2TiF_6+2KCl \rightarrow K_2TiF_6+2HCl$, wherein the potassium fluotitanate ($K_2TiF_6$) is removed by centrifuge dripping filtrating; and
   C. adding $K_2CO_3$ solution to a remaining $H_3FeF_6+H_2O+HCl$ solution remained after the centrifuge dripping filtrating of step B to a third reaction furnace and react with the remaining solution and controlling the pH value according to a reaction $H_3FeF_6+K_2CO_3+HCl+H_2O \rightarrow Fe(OH)_3+KCl+KF+H_2O$, wherein the element Fe is removed by a form of $Fe(OH)_3$ flocculent precipitate and the potassium chloride (KCl) is recycled.

4. The potassium fluotitanate ($K_2TiF_6$) manufacture process of claim 3, wherein during the step C, the pH value is controlled in a range of 2-3, 3-4, 4-5, or 5-7.

\* \* \* \* \*